United States Patent
Kobayashi

[11] Patent Number: 5,836,238
[45] Date of Patent: Nov. 17, 1998

[54] DEEP-FRYING APPARATUS

[75] Inventor: Toshihiro Kobayashi, Nagoya, Japan

[73] Assignee: Paloma Industries, Ltd., Aichi, Japan

[21] Appl. No.: 890,168

[22] Filed: Jul. 9, 1997

[30]  Foreign Application Priority Data

Aug. 9, 1996 [JP] Japan .................................. 8-227855

[51] Int. Cl.$^6$ ................................................ A47J 37/12
[52] U.S. Cl. .............................. 99/403; 99/330; 99/408; 126/391
[58] Field of Search ........................... 99/330, 331, 403, 99/408, 407, 409; 126/390, 391, 374, 375, 350 R, 360 R; 210/167, DIG. 8; 426/417, 438, 523; 431/329, 328, 326, 18; 219/442, 441, 492, 440; 428/422, 428, 421, 463, 446, 450, 451, 458, 331, 333, 358

[56]  References Cited

U.S. PATENT DOCUMENTS

| | | | |
|---|---|---|---|
| 3,938,948 | 2/1976 | Moore et al. | 431/347 |
| 3,948,593 | 4/1976 | Moore et al. | 431/8 |
| 3,990,433 | 11/1976 | Keating | 126/391 |
| 4,289,477 | 9/1981 | Moore et al. | 431/171 |
| 4,397,299 | 8/1983 | Taylor et al. | 126/391 |
| 4,690,127 | 9/1987 | Sank | 99/403 X |
| 4,848,318 | 7/1989 | Brewer | 126/390 |
| 4,947,824 | 8/1990 | Ejiri et al. | 431/1 X |
| 5,038,753 | 8/1991 | Yokoyama et al. | 126/391 |
| 5,209,218 | 5/1993 | Daneshvar et al. | 99/403 X |
| 5,253,566 | 10/1993 | McCabe et al. | 99/330 X |
| 5,261,322 | 11/1993 | Yokoyama et al. | 99/331 X |
| 5,297,474 | 3/1994 | Tabuchi | 99/344 |
| 5,546,851 | 8/1996 | Goto | 99/446 |

*Primary Examiner*—Timothy F. Simone
*Attorney, Agent, or Firm*—Robin, Blecker & Daley

[57] ABSTRACT

A deep-frying apparatus includes an oil tank for holding cooking oil in which food is fried. The oil tank includes sloping walls. Burners positioned outside of the oil tank heat the sloping walls. Interior surfaces of the oil tank near the surface of the cooking oil and the interior surfaces of the sloping walls are coated with a fluorine compound. The apparatus prevents accumulation of food debris on the interior surfaces of the oil tank and the sloping walls of the oil tank.

3 Claims, 3 Drawing Sheets

A-A Cross Section

DEEP-FRYING APPARATUS

FIELD OF THE INVENTION

This invention is concerned with industrial frying equipment, and more particularly with deep frying equipment in which an oil tank, filled with cooking oil, is directly heated by a heating device.

BACKGROUND OF THE INVENTION

In conventional industrial frying equipment, fried food (such as fried potatoes) is prepared using cooking oil contained in an oil tank heated by a burner outside the tank. In a typical arrangement, the burner directly heats sloping walls that form a portion of the walls of the oil tank. A metal screen is placed above the sloping wall portion of the tank and a basket in which the food is held and cooked is supported by the metal screen.

In using conventional deep fryers, unwanted food debris is often formed as the food (e.g., potatoes) is being cooked. This food debris floats to the surface of the cooking oil or falls onto the sloping walls of the oil tank.

Food debris which floats to the surface of the cooking oil changes the characteristic of the oil which then becomes more viscous as the oil is used for a longer period of time. The food debris also sticks to the sidewalls of the oil tank near the oil surface and is difficult to remove. Cleaning with a tool such as a brush may be required.

Food debris which tends to stick to the sloping walls, hardens into solid carbon because of the very high temperature to which the sloping walls are heated by the burner. The presence of the carbonified food debris on the sloping walls tends to cause additional food debris to stick to the sloping walls. According to a further adverse condition often found in conventional apparatus, the high temperature in the vicinity of the sloping walls tends to increase the viscosity of the cooking oil, which increases the likelihood that food debris floating in the cooking oil may stick to the sloping walls of the oil tank.

Once food debris has accumulated on the sloping walls, propagation of heat from the sloping walls to the cooking oil is impeded and the efficiency of the apparatus in heating the cooking oil is decreased. Consequently, the sloping walls tend to become overheated and the overheated condition of the sloping walls accelerates degradation of the cooking oil in the vicinity of the sloping walls.

Food debris which has been carbonified on the sloping walls is difficult to remove. The carbonified debris must be scrubbed off with a cleaning brush after the cooking oil has been discarded.

OBJECTS AND SUMMARY OF THE INVENTION

It is an object of the invention to provide deep-frying apparatus in which adhesion of fried food debris to the interior walls of the oil tank is reduced or prevented.

It is a further object of the invention to provide deep-frying apparatus in which premature deterioration of the cooking oil is prevented.

According to an aspect of the invention, there is provided a deep-frying apparatus including an oil tank for holding cooking oil in which food is fried, the oil tank including sloping walls and a heating device positioned outside of the oil tank for heating the sloping walls of the tank. The interior surface of the oil tank near the cooking oil surface is coated with a fluorine compound.

According to another aspect of the invention, the sloping walls of the oil tank are coated with a fluorine compound.

According to a further aspect of the invention both the interior surface of the oil tank near the cooking oil surface and the sloping walls are coated with a fluorine compound. In the deep-frying apparatus of the present invention, even when fried food debris floats to the surface of the cooking oil and comes into contact with the interior surface of the oil tank, the food debris is less likely to stick to the interior surfaces of the oil tank because the interior surface has been coated with a fluorine compound. As a result, the walls of the oil tank need to be cleaned less frequently and cleaning becomes easier because the food debris can be removed without much effort.

The deep-frying apparatus of the present invention also allows food debris which falls onto the sloping walls to fall to the bottom of the oil tank so as not to adhere to and accumulate and become carbonified on the sloping walls of the tank. This is because the sloping walls are coated with a fluorine compound which makes it less likely to stick to the sloping walls which are heated to a high temperature. Consequently, conduction of heat from the heated sloping walls into the cooking oil is not impeded by accumulated food debris and the useful life of the cooking oil is extended. In addition, when fried food debris slides down the sloping walls into the bottom of the oil tank where it accumulates, the fried food debris does not turn into carbon because the oil at the bottom of the oil tank has a lower temperature. Degradation of the cooking oil is also prevented.

In consequence, the deep-frying equipment provided in accordance with the invention is easier to maintain, and need not be cleaned as frequently as conventional apparatus. Further, the cooking oil in the vicinity of the sloping walls of the oil tank is prevented from degrading due to overheating, because heat conduction through the sloping walls is not reduced by food debris so that the sloping walls are not caused to overheat.

Where both the interior surfaces of the oil tank near the surface of the cooking oil and the sloping walls of the oil tank are coated with a fluorine compound, fried food debris is less likely to stick to the fluorine compound coated surfaces. Hence, cleaning is made easier and degradation of the cooking oil is reduced.

DESCRIPTION OF PREFERRED EMBODIMENTS

Figure 1:
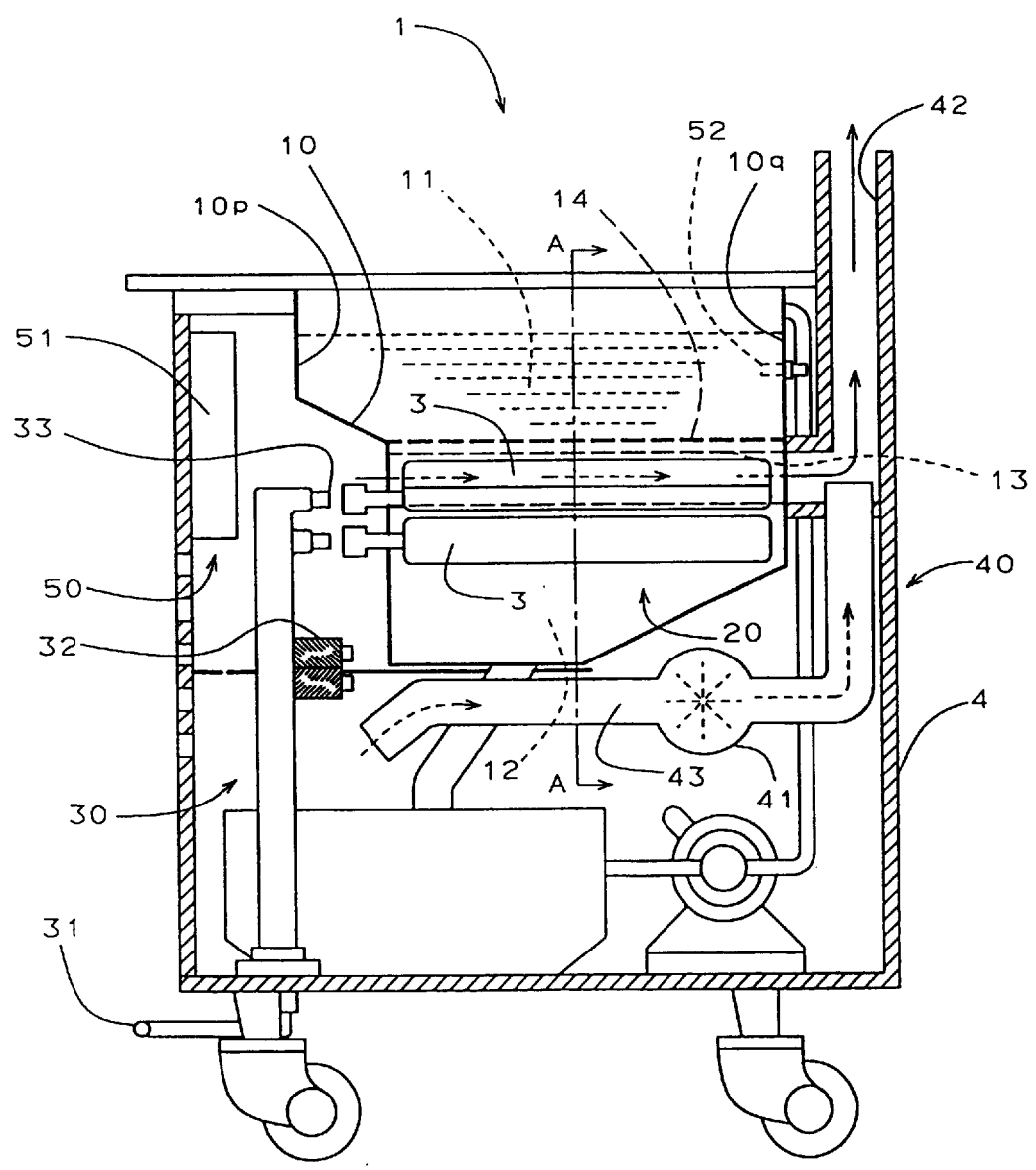
FIG. 1 is a cross-sectional side view of a frying apparatus provided in accordance with the invention.

An embodiment of the invention will now be described, initially with reference to FIG. 1. In FIG. 1, reference numeral 1 generally indicates a frying apparatus. The frying apparatus 1 includes an oil tank 10, a heating device 20, and a housing 4. The oil tank 10 is filled with cooking oil in which food is fried. The heating device 20 includes burners 3 which heat the cooking oil contained in the oil tank 10. The oil tank 10 and heating device 20 are housed within the housing 4.

Figure 2:
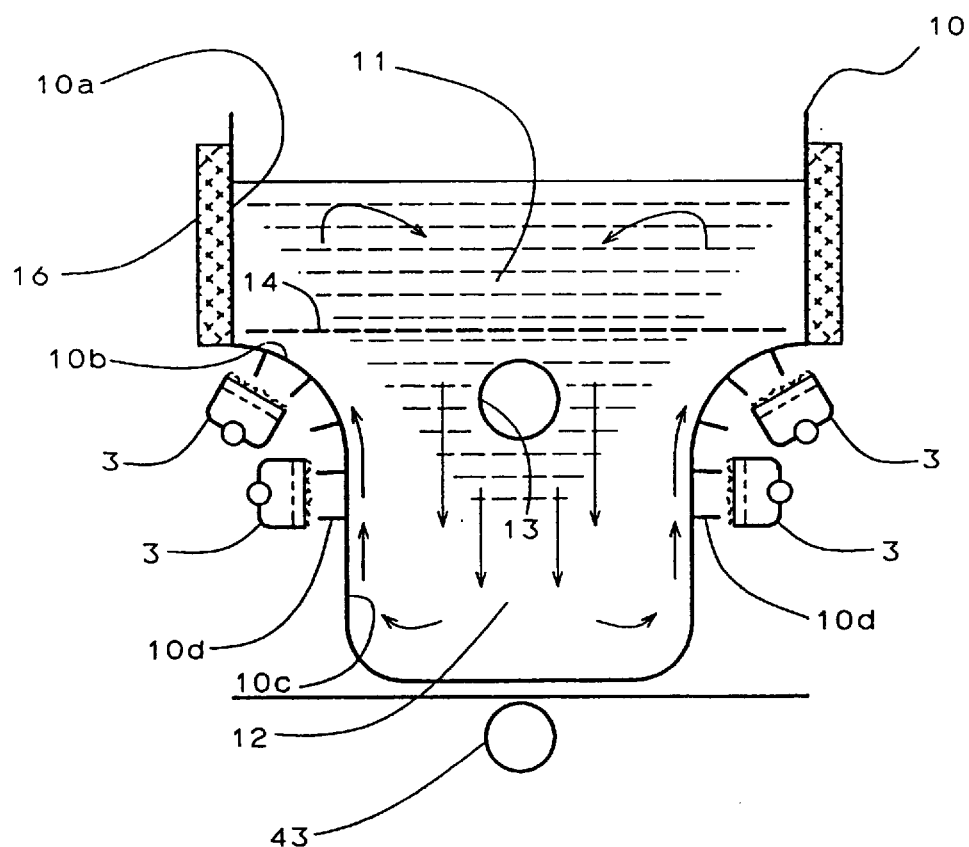
FIG. 2 is a front cross-sectional view, taken at a line A—A of FIG. 1, of an oil tank that is part of the frying apparatus of FIG. 1.

As seen from FIG. 2, right and left sides of the oil tank 10 include sloping walls 10b. The sloping walls gradually slope down toward the bottom of the oil tank. The oil tank 10 includes two zones, respectively indicated by reference numerals 11 and 12. The zone 11 is a cooking zone in which food is placed for cooking. The cooking zone 11 is above the sloped walls 10*b* and is defined at its lower limit by a screen 14. The zone 12 is considered to be in the portion of the tank below the sloping walls 10*b*, and the oil therein is lower in temperature than the oil in the upper portions of the oil tank 10. The zone 12 is sometimes referred to as a "cold zone". An exhaust passage 13 passes through the middle of the oil tank 10 in the direction from the front to the back of the oil tank. Several fins 10*d* are welded onto the outside of the sloping walls 10*b*. The fins 10*d* also run in the direction from the front to the back of the oil tank.

The left and right sides of the cooking zone 11 are defined by the upper side walls 10*a*, the front side by a front wall 10*p*, and the back side by a back wall 10*q*. The left and right sides of the cold zone 12 are defined by the lower side walls 10*c*. A heat insulator 16 is attached to the outer surface of the upper side walls 10*a*.

Figure 3:
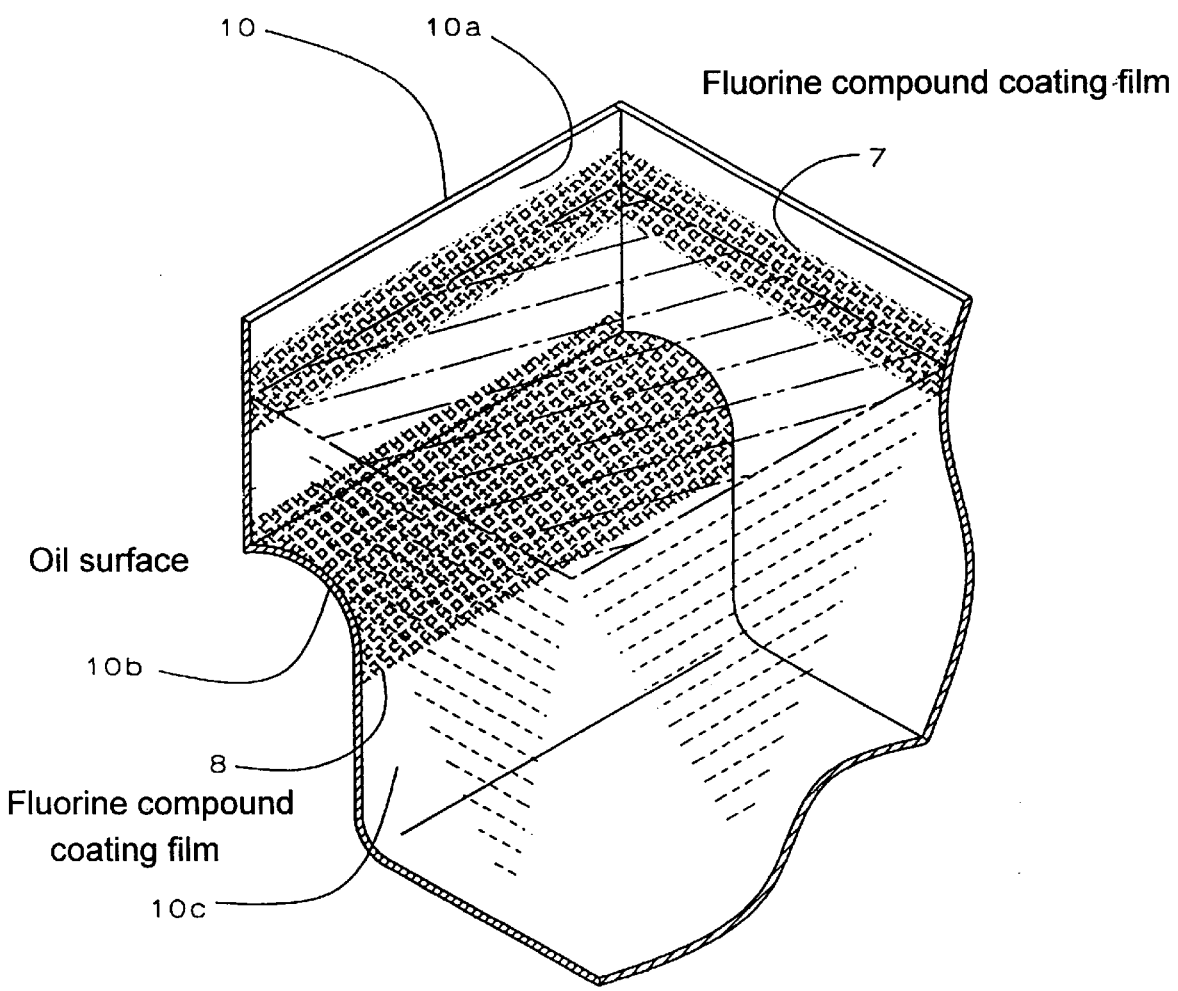
FIG. 3 is a partial view of the oil tank showing certain interior surfaces covered with a fluorine compound coating.

Interior surfaces of the oil tank 10 such as the upper sidewalls 10*a*, the front wall 10*p* and the back wall 10*q* and the surface of the sloping walls 10*b* are covered with a fluorine compound coating film 7 and 8, as shown in FIG. 3. The fluorine compound suitable for this purpose may be, for example, polytetra fluoro ethylene (PTFE), tetra fluoro ethylene-per fluoro alkyl vinyl ether copolymer (PFA) or fluorinated ethylene-propylene copolymer (FEP).

As shown in FIGS. 1 and 2, the heating device 20 includes burners 3, a gas supply section 30, an air supply and exhaust section 40, and a flame control unit 50. The burners 3 are placed near the sloping walls 10*b* and operate to heat the sloping walls 10*b*. The fuel supply section 30 supplies fuel to the burners 3. The air supply/exhaust section 40 supplies air to the burners 3. The flame control unit 50 controls the burners 3 and the temperature of the oil tank 10. The burners 3 are formed as a ceramic plate with rows of flame orifices. The burners 3 are of the totally primary air combustion system which produce a flame at the front surface of the ceramic plate. Two upper burners and two lower burners are positioned along each of the two sloping surfaces 10*b*.

The fuel supply section 30 includes a gas inlet 31, electromagnetic gas valves 32, and gas nozzles 33. The gas inlet 31 is mounted at the bottom surface of the housing 4. The electromagnetic gas valves 32 are located between the gas inlet 31 and the gas nozzles 33. The valves 32 selectively open and close a gas flow passage provided from the gas inlet 31 to the gas nozzles 33. The gas nozzles 33 are located at a point where the gas enters the burners 3. The nozzles 33 inject gas into the burners 3. The fuel supply section 30 supplies the fuel to the burners 3 and introduces primary air to feed the flame at the gaps between the nozzles 33 and the burners 3.

The air supply/exhaust section 40 includes an air supply pipe 43, a fan 41 and an exhaust pipe 42. The air supply pipe 43 is mounted below the oil tank 10. The fan 41 directs air into and out of the air supply pipe 43. The exhaust pipe 42 runs upward at the rear of the housing 4. Air flow provided by the fan 41 pulls exhaust from the burners 3 into the exhaust pipe 42 and then out of the frying apparatus. Air supplied to the air supply pipe 43 and the burners 3 passes through the front surface of the apparatus into the housing 4 via apertures in the housing 4.

The fan 41 of the air supply/exhaust section 40 blows air into the exhaust pipe 42. The resulting flow of air cools the exhaust pipe 42 and prevents it from overheating. Moreover, this flow of air draws exhaust passing through the exhaust passage 13 into the exhaust pipe 42.

The burners 3 radiate heat to the sloping walls 10*b* and the fins 10*d* of the oil tank 10. Consequently, heat is transferred through the sloping walls 10*b* to the cooking oil in the oil tank 10. Part of the exhaust generated by the burners 3 enters into the exhaust pipe 42 at the right and left sides of the rear portion of the frying apparatus. The remainder of the exhaust from the burners 3 passes through the exhaust passage 13, which runs through the middle of the oil tank 10, and then the exhaust passing through the passage 13 enters the exhaust pipe 42. As a result, heat is transferred to the cooking oil from the exhaust passing through the passage 13, which improves the efficiency of the frying apparatus.

The flame control unit 50 includes a microprocessor controller 51, and a temperature sensor 52 mounted inside the oil tank 10. On the basis of signals provided by the temperature sensor 52, the flame control unit 50 selectively opens and closes the electromagnetic gas valves 32 to switch the flame on and off, so that the temperature of the oil in the oil tank 10 is maintained within a certain range.

Cooking is performed in the frying apparatus 1 when cooking oil contained in the oil tank 10 is heated and a basket of food (such as slices of potatoes) is immersed in the oil in the cooking zone 11. Heat radiated from the burners 3 is applied to the sloping walls 10*b* and the fins 10*d*, and is transmitted to the cooking oil to raise the temperature of the cooking oil in the vicinity of the sloping walls 10*b*. As indicated by the arrows shown in FIG. 2, the heated cooking oil rises along the sloping walls 10*b* to reach the cooking zone 11. At the same time, lower temperature cooking oil in the cold zone 12 moves upwardly toward the sloping walls 10*b*. The cooking oil in the middle of the cooking zone 11 moves downwardly toward the cold zone 12, 50 that a convective flow is formed in the cooking oil. The relatively hot cooking oil in the cooking zone 11 causes the food to be cooked. After a certain period of time, the cooking process is completed.

As cooking takes place, food debris generated in the cooking zone 11 floats to the surface of the cooking oil and may come in contact with the interior surfaces of the oil tank. The debris may also fall through the basket (not shown) and the screen 14 and down into the cold zone 12. If the fried food debris floats and comes in contact with the interior surface of the oil tank, the debris is less likely to stick to the surfaces because of the fluorine compound coating film 7. As a result, the walls of the oil tank need to be cleaned less frequently. When the oil tank is cleaned, fried food debris which may be stuck to the walls is more easily removed and cleaning is less laborious.

Because the sloping walls 10*b* are also covered with the fluorine compound coating film 8, when fried food debris falls onto the sloping walls 10*b*, the debris slides down and falls to the deepest area of cold zone 12. Because the debris does not stick to the sloping walls 10*b*, it is not carbonified and does not accumulate on the sloping walls 10*b*. Fried food debris which falls to the bottom of cold zone 12 remains in the oil tank 10, but is not carbonified because the temperature of the oil in the cold zone 12 is relatively low. Consequently, the cooking oil does not suffer from degradation which might occur if carbonified food debris were present in the oil tank.

Furthermore, although small fried food debris tends to float in the cooking oil rather than sink to the bottom quickly, the small fried food debris is therefore less likely to stick to the sloping walls 10*b* because of the fluorine compound coating film 8. As a result, thermal conduction from the sloping walls 10*b* to the cooking oil remains high and the sloping walls 10*b* do not overheat, which also helps to prevent the cooking oil from degrading prematurely. The cost of operating the apparatus is reduced because the cooking oil need not be changed as frequently as in conventional apparatus.

As previously pointed out, in the frying apparatus described herein food debris is prevented from adhering to the interior surfaces of the oil tank because the surfaces are covered with a fluorine compound coating. As a result, the walls of the oil tank need to be cleaned less frequently. When they are cleaned, debris is more easily removed and cleaning is easier and faster. Food debris is less likely to solidify into carbon and the falling debris which accumulates at the bottom of the oil tank also does not turn into carbon. Thus, the cooking oil in the apparatus of the present invention does not become degraded prematurely. The apparatus is easier to use than conventional apparatus since the cooking oil does not have to be changed as often as in conventional apparatus.

Finally, thermal conduction across the sloping walls remains high and the sloping walls are not overheated. This also tends to prevent the cooking oil from degrading prematurely due to overheating. Thus, the fryer of the invention is user friendly and operation thereof is more economical.

It will be recognized that further modifications may be made to the foregoing embodiments without departing from the invention. The particularly preferred embodiments disclosed herein are thus intended in an illustrative and not limiting sense. The true spirit and scope of the invention is set forth in the following claims.

What is claimed is:

1. A deep-frying apparatus, comprising:

an oil tank having interior surfaces for holding cooking oil in which food is immersed for cooking;

heating means positioned outside of said oil tank; and said interior surfaces at substantially vertical walls of said oil tank and near the cooking oil surface of said oil tank being coated with a fluorine compound.

2. A deep-frying apparatus, comprising:

an oil tank for holding cooking oil in which food is immersed for cooking;

said oil tank including sloping walls;

heating means positioned outside of said oil tank for heating said sloping walls;

holding means to hold said food for frying above said sloping walls; and said sloping walls being coated with a fluorine compound.

3. An apparatus according to claim 2, wherein the interior surface of the oil tank near the cooking oil surface is coated with a fluorine compound.

\* \* \* \* \*

UNITED STATES PATENT AND TRADEMARK OFFICE
CERTIFICATE OF CORRECTION

PATENT NO. : 5,836,238
DATED : November 17, 1998
INVENTOR(S) : Toshihiro Kobayashi It is certified that error appears in the above-identified patent and that said Letters Patent is hereby corrected as shown below:

Column 3, line 13, delete "1ob" and insert --10b--.

Signed and Sealed this

Tenth Day of August, 1999

Q. TODD DICKINSON

*Attest:*

*Attesting Officer*  *Acting Commissioner of Patents and Trademarks*